US 7,886,140 B2

(12) United States Patent
Jiang

(10) Patent No.: US 7,886,140 B2
(45) Date of Patent: Feb. 8, 2011

(54) BOOTING A COMPUTER USING A BOOT LIST WHEN A NON-VOLATILE MEMORY ON THE COMPUTER DOES NOT CONTAIN THE BOOT LIST

(75) Inventor: Liang Jiang, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 792 days.

(21) Appl. No.: 11/840,007

(22) Filed: Aug. 16, 2007

(65) Prior Publication Data

US 2009/0049293 A1 Feb. 19, 2009

(51) Int. Cl.
*G06F 15/177* (2006.01)
(52) U.S. Cl. .................. 713/2; 713/1; 713/100
(58) Field of Classification Search .......... 713/1, 713/2, 100
See application file for complete search history.

(56) References Cited

U.S. PATENT DOCUMENTS 6,691,225 B1 * 2/2004 Suffin ............... 713/2
2004/0215952 A1 * 10/2004 Oguma ............... 713/1
2005/0160256 A1 7/2005 Huang et al.

OTHER PUBLICATIONS

Bealkowski, "Boot Path Selection Verification and Override", IBM Research Disclosure vol. 42, No. 422, article 422116, Jun. 1999, pp. 1-2.

* cited by examiner

*Primary Examiner*—Nitin C Patel
(74) *Attorney, Agent, or Firm*—Yee & Associates, P.C.; David A. Mims, Jr.

(57) ABSTRACT

A computer implemented method, apparatus, and computer program product for booting a computer using a boot list. A determination is made as to whether a boot list is present in a non-volatile memory of the computer. The boot list is a set of paths, in which each path in the boot list is a path of a storage device. If the boot list is not present, a search is performed for the boot list in a reserved area of each storage device in a set of storage devices. When the boot list is found in the reserved area of a storage device in the set of storage devices, the boot list is copied from the reserved area of the storage device in the set of storage devices to form a copied boot list. The copied boot list is stored in the non-volatile memory to form a stored boot list. The computer is booted using the stored boot list in the non-volatile memory.

18 Claims, 5 Drawing Sheets

BOOTING A COMPUTER USING A BOOT LIST WHEN A NON-VOLATILE MEMORY ON THE COMPUTER DOES NOT CONTAIN THE BOOT LIST

BACKGROUND OF THE INVENTION

1. Field of the Invention

The present invention relates generally to data processing systems and in particular to booting a computer in a data processing system. Still more particularly, the present invention relates to a computer implemented method, apparatus, and computer program code for booting a computer using a boot list.

2. Description of the Related Art

Firmware in a computer is used to load software, in the form of a boot image, into the computer. The firmware is stored in non-volatile memory in the computer. Non-volatile memory is memory in which the contents of the memory survive when there power to the computer is shut-off. Usually, a boot list is also stored in non-volatile memory. The boot list contains paths to devices. The firmware searches each storage device referenced by a path in the boot list for a boot image. Once the firmware finds a boot image, the firmware loads the boot image into the computer.

In specific situations, the non-volatile memory may not contain a boot list. For example, when a firmware upgrade is performed, new firmware is loaded into the non-volatile memory, and the boot list may be deleted as part of the firmware upgrade. Another example of a situation in which the non-volatile memory may not contain a boot list occurs when a user manually deletes the boot list.

When non-volatile memory in a computer does not contain a boot list, firmware in the computer creates a boot list. To create a boot list, the firmware identifies each storage device connected to the computer, and searches each storage device connected to the computer for a boot image. When many storage devices are connected to the computer, or when each storage device is large, creating a boot list may take a long time, significantly delaying the boot up of the computer.

SUMMARY OF THE INVENTION

The illustrated embodiments described herein provide a computer implemented method, apparatus, and computer program product for booting a computer using a boot list. A determination is made as to whether a boot list is present in a non-volatile memory of the computer. The boot list is a set of paths, in which each path in the boot list is a path of a storage device. If the boot list is not present, a search is performed for the boot list in a reserved area of each storage device in a set of storage devices. When the boot list is found in the reserved area of a storage device in the set of storage devices, the boot list is copied from the reserved area of the storage device in the set of storage devices to form a copied boot list. The copied boot list is stored in the non-volatile memory to form a stored boot list. The computer is booted using the stored boot list in the non-volatile memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
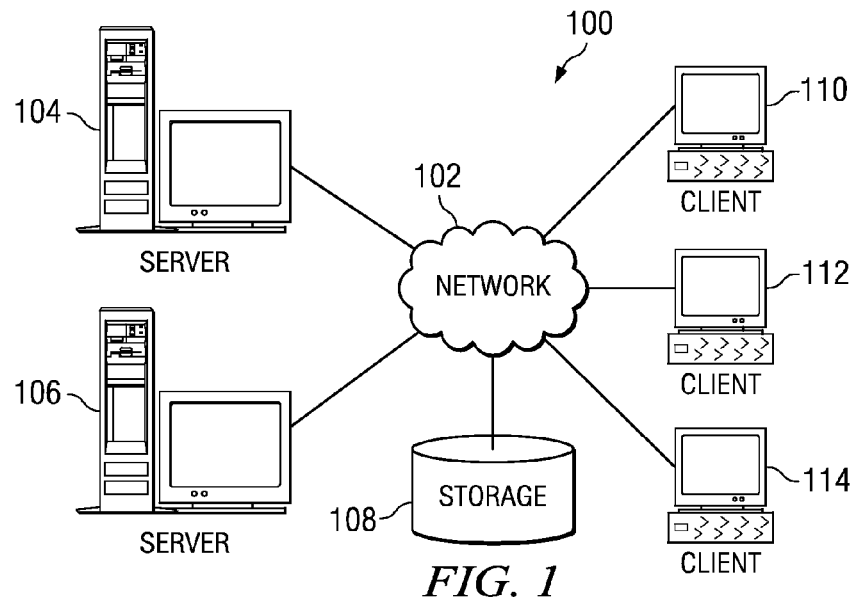
FIG. 1 depicts a pictorial representation of a network of data processing systems in which illustrative embodiments may be implemented.
Figure 2:
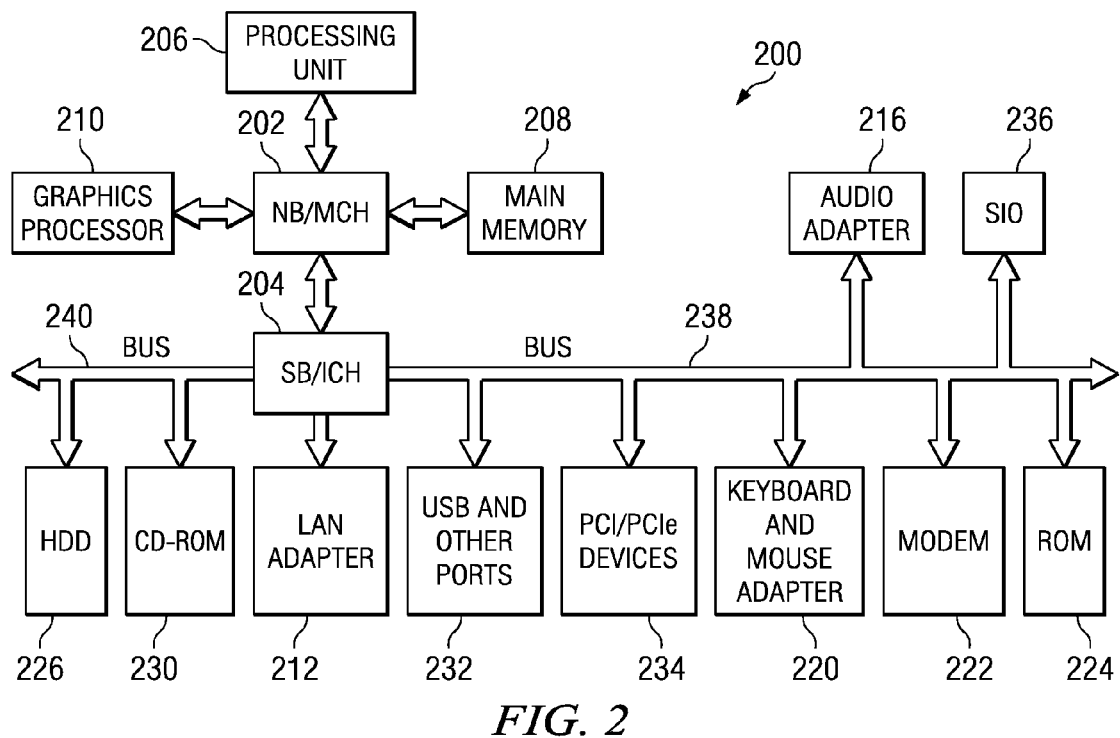
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including a north bridge and memory controller hub (NB/MCH) 202 and a south bridge and input/output (I/O) controller hub (SB/ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the NB/MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238, and hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
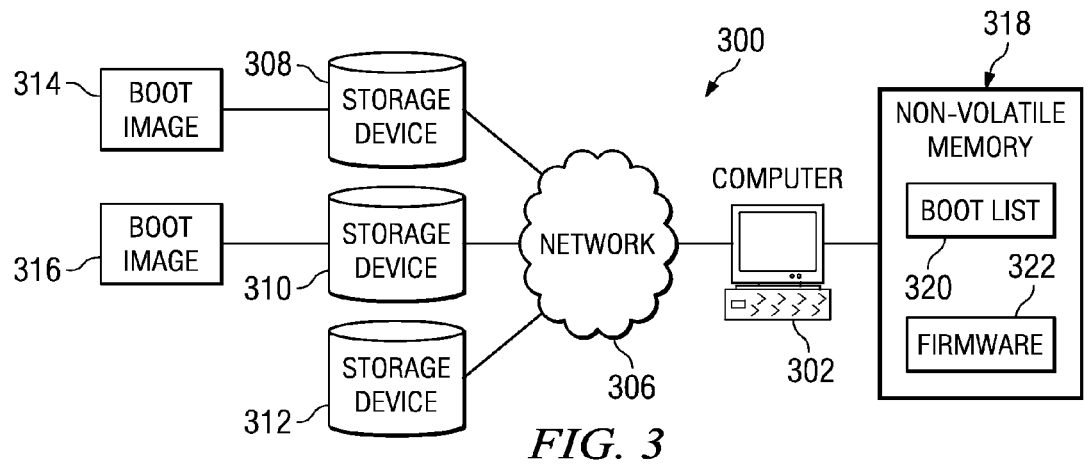
FIG. 3 is a block diagram of a computer system in accordance with an illustrative embodiment.

FIG. 3 is a block diagram of a computer system in accordance with an illustrative embodiment. In multiple storage device environment 300, computer 302 is connected to network 306. Computer 302 may be a client, such as client 110 in FIG. 1, or a server, such as server 104 in FIG. 1. Network 306 is a network, such as network 102. For example, network 306 may be a local area network (LAN), wide area network (WAN), or a storage area network (SAN). Storage devices 308, 310, and 312 are connected to computer 302 via network 306.

Storage devices 308-312 are each used for storing data and retrieving stored data. For example, each storage device in storage devices 308-312 may be a hard disc drive, or an optical storage drive. The data stored and retrieved on storage devices 308-312 may include a boot image. A boot image is a file containing an operating system. The boot image is loaded into hardware, such as, for example, computer 302. In this example, storage device 308 contains boot image 314, and storage device 310 contains boot image 316.

A computer typically has at least two types of memory; volatile memory, and non-volatile memory. Volatile memory is memory which requires power to store data. When the computer is powered down, the contents of the volatile memory are lost. In contrast, any data stored in non-volatile memory remains stored even when the computer is powered down. For this reason, non-volatile memory is normally used to store data for booting the computer.

Normally, a firmware and a boot list are stored in non-volatile memory for booting the computer. In this example, computer 302 contains non-volatile memory 318, and non-volatile memory 318 contains boot list 320 and firmware 322. A boot list, such as boot list 320, contains a set of paths in a specific order. A set of paths is one or more paths. Each path in the set of paths is a path to a storage device containing a boot image. For example, the paths for storage devices 308-310 may be in boot list 320 because storage devices 308-310 each contain a boot image.

Firmware, such as firmware 322, contains computer usable code for using a boot list, such as boot list 320, to boot the computer. Firmware 322 is generally executed under specific circumstances, such as when computer 302 is powered on. For example, when computer 302 is powered on, firmware 322 may search each storage device referenced by a path in boot list 320, in the order specified in boot list 320. The firmware searches each storage device referenced by a path in the boot list for a boot image. Once the firmware finds a boot image, the firmware loads the boot image into the computer. For example, assume boot list 320 contains a path to storage device 312, a path to storage device 310, and a path to storage device 308. Firmware 322 first searches storage device 312 for a boot image. When firmware 322 does not find a boot image on storage device 312, firmware 322 next searches storage device 310 for a boot image, and finds boot image 316. After firmware 322 finds boot image 316, firmware 322 loads boot image 316 into computer 302.

In specific situations, non-volatile memory 318 may not contain a boot list, such as boot list 320. For example, when a firmware upgrade is performed, new firmware is loaded into non-volatile memory, and the boot list may be deleted as part of the firmware upgrade. Another example of a situation in which the non-volatile memory may not contain a boot list occurs when a user manually deletes the boot list.

When non-volatile memory in a computer does not contain a boot list, firmware in the computer creates a boot list. To create a boot list, the firmware identifies each storage device connected to the computer, and searches each storage device connected to the computer for a boot image. In this example, firmware 322 may identify storage devices 308-312 and search each storage device for a boot image. When many storage devices are connected to the computer, or when each storage device is large, creating a boot list may take a long time, significantly delaying the boot up of the computer. The illustrative embodiments recognize a need for creating and storing a boot list in a location different than the non-volatile memory to allow the boot list to be retrieved when the boot list is not in non-volatile memory.

The illustrated embodiments described herein provide a computer implemented method, apparatus, and computer program product for booting a computer using a boot list. A determination is made as to whether a boot list is present in a non-volatile memory of the computer. The boot list is a set of paths, in which each path in the boot list is a path of a storage device. If the boot list is not present, a search is performed for the boot list in a reserved area of each storage device in a set of storage devices. When the boot list is found in the reserved area of a storage device in the set of storage devices, the boot list is copied from the reserved area of the storage device in the set of storage devices to form a copied boot list. The copied boot list is stored in the non-volatile memory to form a stored boot list. The computer is booted using the stored boot list in the non-volatile memory.

Figure 4:
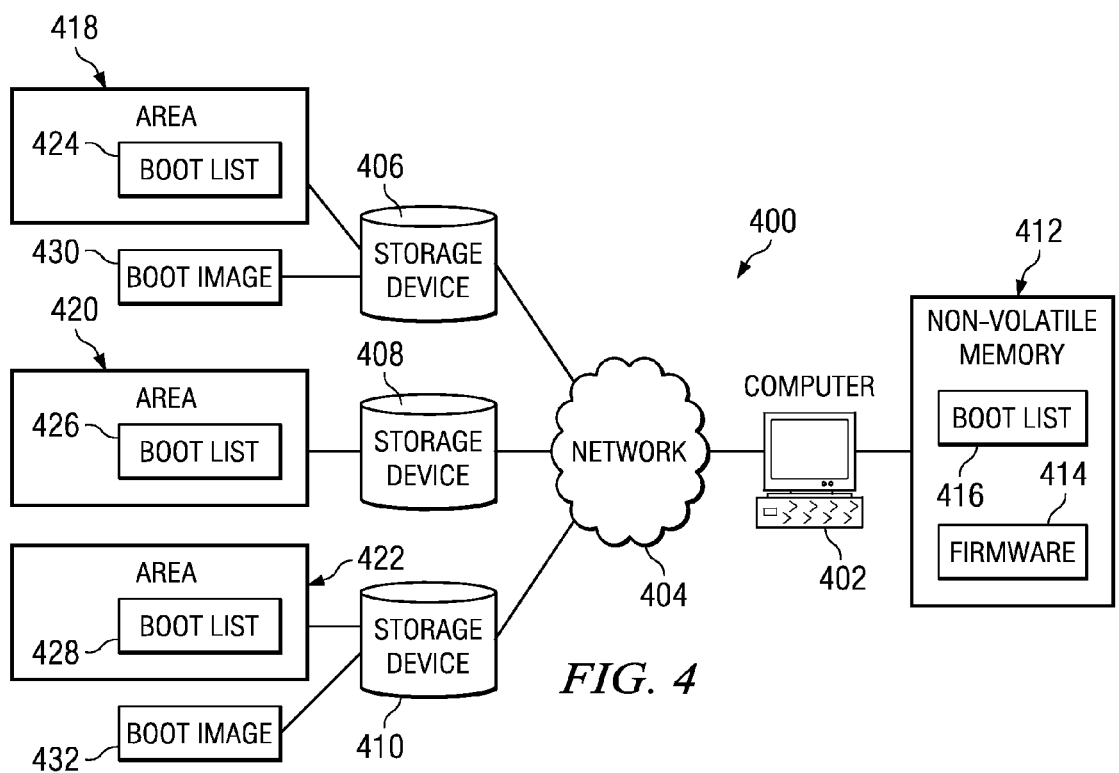
FIG. 4 is a block diagram of a using a reserved area in each storage device in a computer system in accordance with an illustrative embodiment.

FIG. 4 is a block diagram of a using a reserved area in each storage device in a computer system in accordance with an illustrative embodiment. In using a reserved area in each storage device in a multiple storage device environment 400, computer 402 is connected to network 404. Computer 402 is a computer, such as computer 302 in FIG. 3. Network 404 is a network, such as network 306 in FIG. 3. Storage devices 406, 408, and 410 are connected to computer 402 via network 404. Storage devices 406-410 are storage devices, such as storage devices 308-312 in FIG. 3.

Computer 402 contains non-volatile memory 412. Non-volatile memory 412 contains firmware 414 and boot list 416. Firmware 414 is modified to perform specific actions when a computer system is booted after the initial installation, when a storage device is first connected, and when a boot list is not present in non-volatile memory.

When the computer system shown in FIG. 4 is first booted after the initial installation, firmware determines if boot list 416 is in non-volatile memory 412. Typically, a user creates boot list 416 as part of the initial installation. If boot list 416 is in non-volatile memory 412, then firmware 414 creates a reserved area on each storage device connected to computer 402, and stores a copy of boot list 416 in the reserved area of the storage device. If firmware 414 cannot create a reserved area on a specific storage device, then the boot list is not stored on the specific storage device. The reserved area on a storage device is a relatively small amount of storage space on the storage device which is accessible only to the storage device, and to low-level code, such as firmware 414. In this example, firmware 414 creates area 418 on storage device 406, area 420 on storage device 408, and area 422 on storage device 410. Areas 418-422 are reserved areas on storage devices 406-410. Firmware 414 copies boot list 416 from non-volatile memory 412, and stores boot list 416 in areas 418-422 to create boot list 424, 426, and 428.

When a storage device is first connected to the computer, the firmware creates a reserved area on the storage device, copies the boot list from non-volatile memory, and stores the boot list in the reserved area of the storage device. In this example, when storage device 410 is connected to computer 402 via network 404 for the first time, firmware 414 creates reserved area 422, copies boot list 416 from non-volatile memory 412, and stores boot list 416 in area 422 as boot list 428.

When a computer is booted, the firmware of the computer determines whether there is a boot list in non-volatile memory. If the firmware finds the boot list in non-volatile memory, then the firmware uses the boot list to boot the computer. If the firmware determines boot list is not in non-volatile memory, then the firmware looks for a boot list in the reserved area of each storage device connected to the computer. In this example, assume boot list 416 is not in non-volatile memory 412. When computer 402 is booted, firmware 414 determines if boot list 416 is in non-volatile memory 412. If firmware 414 finds boot list 416 in non-volatile memory 412, then firmware 414 uses boot list 416 to boot computer 402. If firmware 414 determines boot list 416 is not in non-volatile memory 412, then firmware 414 looks for a boot list in reserved areas 418-422 of storage devices 406-410.

When the firmware finds a boot list in the reserved area of storage device, the firmware copies the boot list from the reserved area of the storage device, and stores the boot list in non-volatile memory in the computer. The firmware then uses the boot list in non-volatile memory to boot the computer. In this example, firmware 414 looks for a boot list in reserved areas 418-422 of storage devices 406-410 and finds boot list 424. Firmware 414 copies boot list 424 from area 418 of storage device 406 and stores the boot list in non-volatile memory 412 as boot list 416. Firmware 414 uses boot list 416 to boot computer 402.

The firmware uses the boot list to find a boot image which is compatible with the computer, and then boots the computer using the boot image. In this example, firmware 414 uses boot list 416 to find a boot image which is compatible with computer 402 to boot computer 402. For example, assume storage device 406 contains boot image 430, and storage device 410 contains boot image 432. Assume also that boot list 416 contains a path to storage device 406, and a path to storage device 410. In addition, assume that boot image 432 is compatible with computer 402, and boot image 430 is not compatible with computer 402. Firmware 414 uses the first path in boot list 416 to find storage device 406. Firmware 414 searches storage device 406 for a boot image. Firmware 414 finds boot image 430, and determines that boot image 430 is not compatible with computer 402. Firmware 414 uses the second path in boot list 416 to find storage device 410. Firmware 414 searches storage device 410 for a boot image. Firmware 414 finds boot image 432, and determines that boot image 430 is compatible with computer 402. Firmware 414 then uses boot image 432 to boot computer 402.

Figure 5:
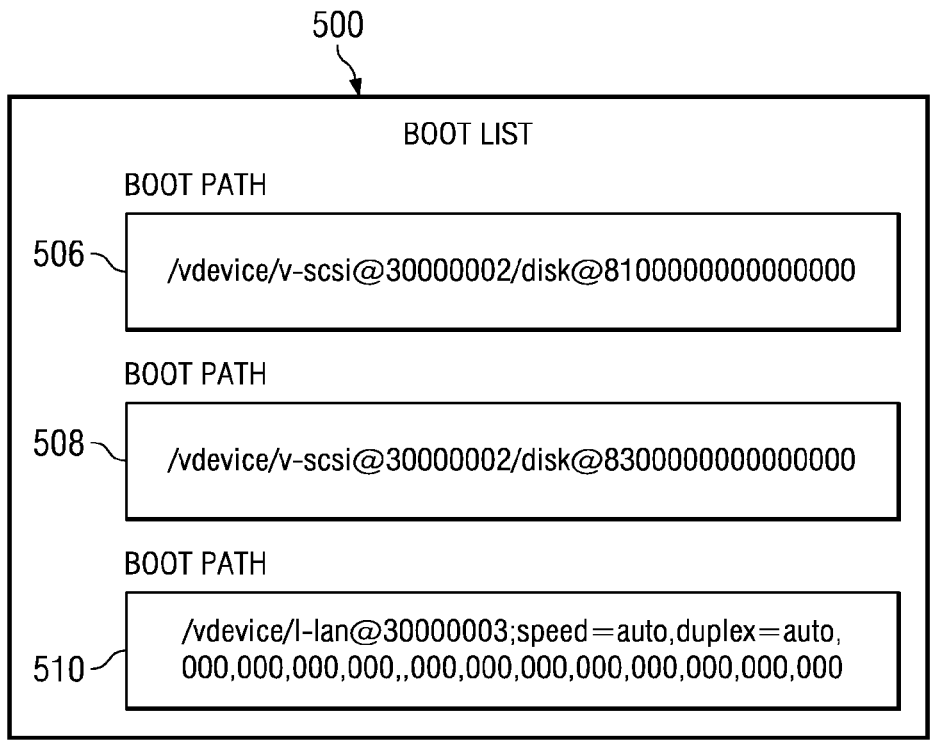
FIG. 5 is an exemplary boot list in accordance with an illustrative embodiment.

FIG. 5 is an exemplary boot list in accordance with an illustrative embodiment. Exemplary boot list 500 is an example of a boot list, such as boot list 416 in FIG. 4. Boot list 500 may be a boot list in a non-volatile memory, such as non-volatile memory 412, or a boot list in a reserved area, such as boot list 424 in area 418. In this example, boot list 500 contains three boot paths, boot paths 506, 508, and 510. Boot paths 506-510 are stored in boot list 502 and accessed in a sequential order. Boot path 506 contains a boot image location for a virtual small computer systems interface (SCSI) disk. Similarly, boot path 508 contains a boot image location from a different small computer systems interface (SCSI) disk on the same bus as boot path 506. Boot path 510 contains a boot image location on a network device.

Figure 6:
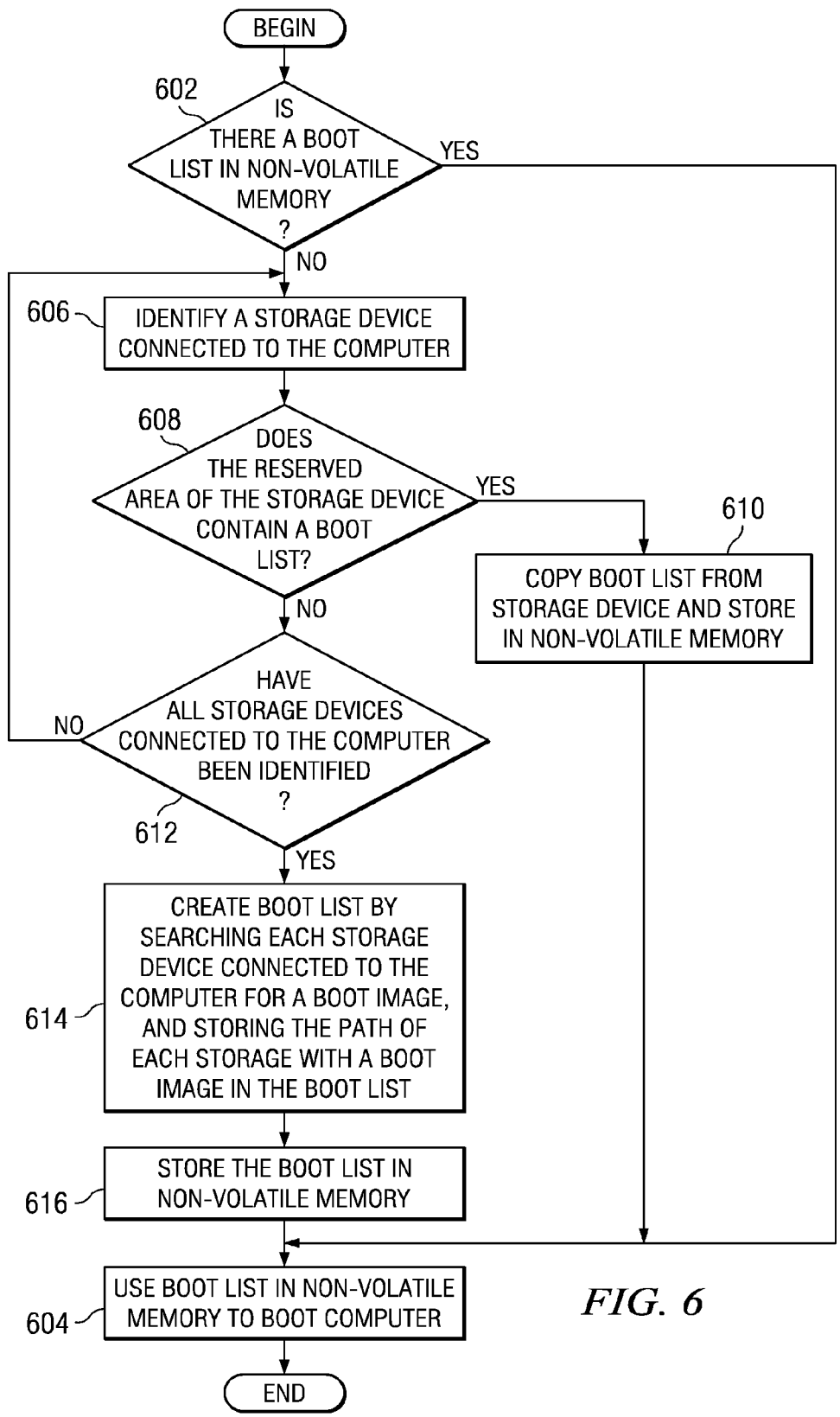
FIG. 6 is a flowchart of using a boot list to boot a computer in accordance with an illustrative embodiment.

FIG. 6 is a flowchart of using a boot list to boot a computer in accordance with an illustrative embodiment. The process in FIG. 6 is executed by firmware, such as firmware 414 in FIG. 4. The process begins when a determination is made as to whether there is a boot list in a non-volatile memory (step 602). Firmware typically executes step 602 when the computer is booted. If the answer in step 602 is "yes", because the non-volatile memory contains a boot list, then the boot list in non-volatile memory is used to boot the computer (step 604), and the process ends. If the answer in step 602 is "no", because the non-volatile memory does not contain the boot list, then a storage device connected to the storage device is identified (step 606).

A determination is made as to whether the reserved area of the storage device contains a boot list (step 608). If the answer in step 608 is "yes", because the reserved area of the storage device contains a boot list, then the boot list is copied from the storage device and stored in non-volatile memory (step 610), the boot list in non-volatile memory is used to boot the computer (step 604), and the process ends. If the answer in step 608 is "no", because the reserved area of the storage device does not contain a boot list, then a determination is made as to whether all storage devices connected to the computer have been identified (step 612). If the answer in step 612 is "no", because all the storage devices connected to the computer have not been identified, then the firmware repeats the previous steps, starting with step 606. If the answer in step 612 is "yes", because all the storage devices connected to the computer have been identified, then a boot list is created by searching each storage device connected to the computer for a boot image, and storing the path of each storage device with a boot image in the boot list (step 614). The boot list is stored in non-volatile memory (step 616), the boot list in non-volatile memory is used to boot the computer (step 604), and the process ends.

Figure 7:
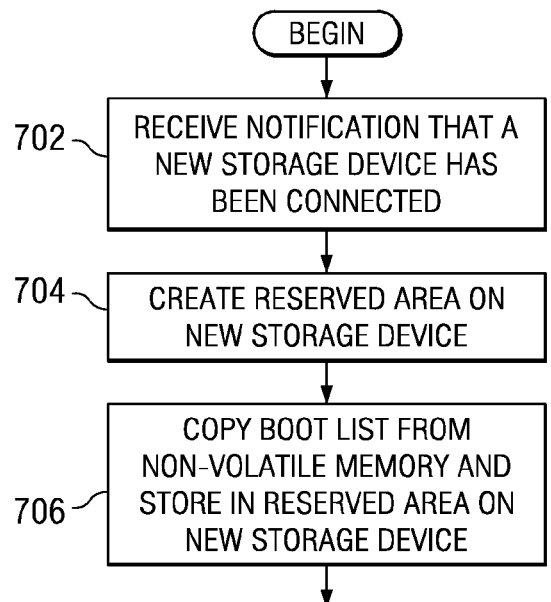
FIG. 7 is a flowchart of adding a boot list to a new storage device in accordance with an illustrative embodiment.

FIG. 7 is a flowchart of adding a boot list to a new storage device in accordance with an illustrative embodiment. The process in FIG. 7 is executed by firmware, such as firmware 414 in FIG. 4. The process begins when a notification is received indicating that a new storage device has been connected (step 702). A reserved area is created on the new storage device (step 704). A boot list is copied from non-volatile memory and stored in the reserved area of the new storage device (step 706), and the process ends.

Figure 8:
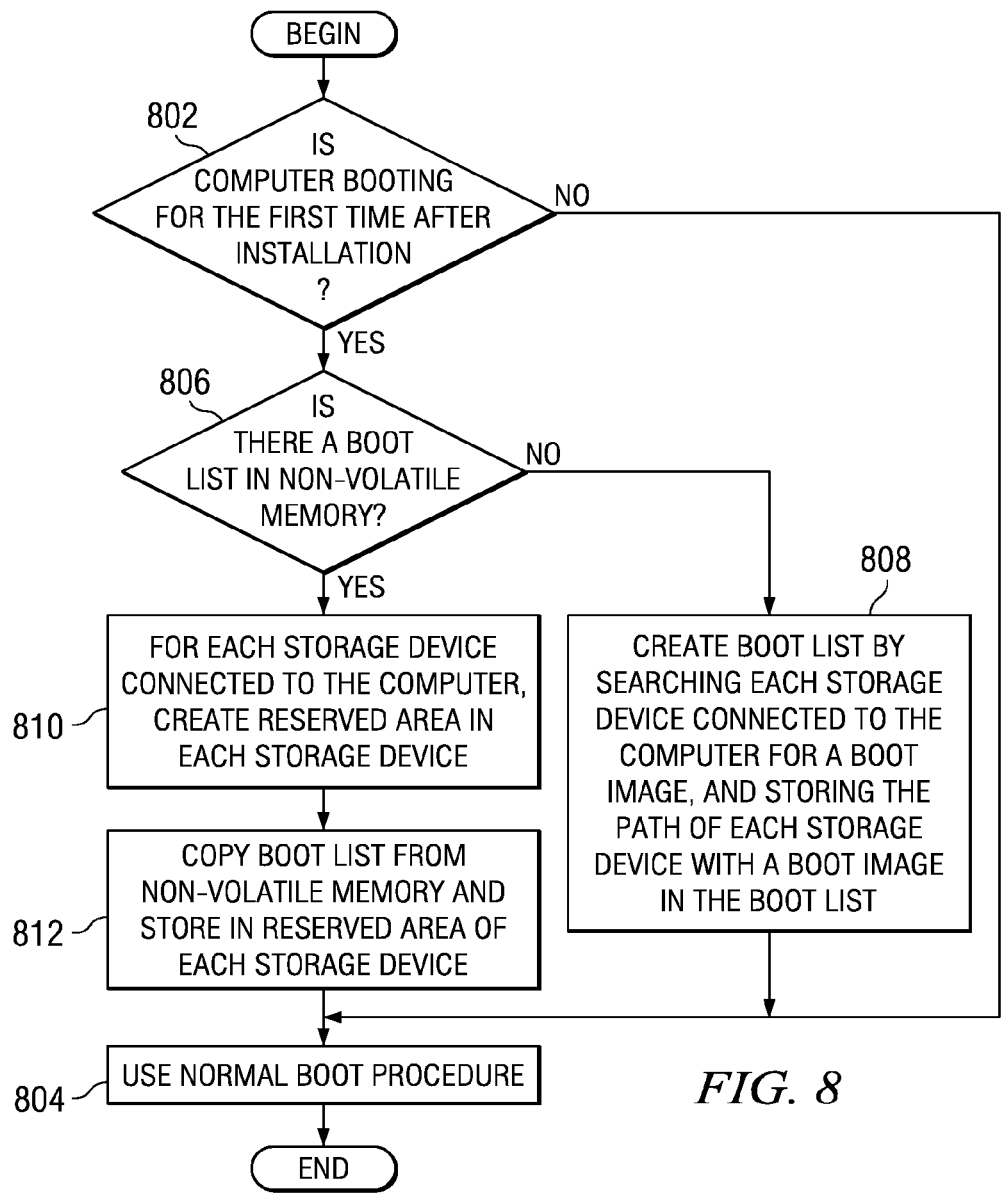
FIG. 8 is a flowchart of adding a boot list to each storage device after initial installation in accordance with an illustrative embodiment.

FIG. 8 is a flowchart of adding a boot list to each storage device after initial installation in accordance with an illustrative embodiment. The process in FIG. 7 is executed by firmware, such as firmware 414 in FIG. 4. The process begins when a determination is made whether the computer is booting for the first time after installation (step 802). If the answer in step 802 is "no", because the computer is not booting for the first time after installation, then the normal boot procedure is used (step 804), and the process ends. The normal boot procedure is the process described in FIG. 6. If the answer in step 802 is "yes", because the computer is not booting for the first time after installation, then a determination is made whether the non-volatile memory contains a boot list (step 806). If the answer in step 806 is "no" because the non-volatile memory does not contain a boot list, then a boot list is created by searching each storage device connected to the computer for a boot image, and storing the path of each storage device with a boot image in the boot list (step 808), the normal boot procedure is used (step 804), and the process ends. If the answer in step 806 is "yes" because the non-volatile memory contains a boot list, then a reserved area is created in each storage device (step 810). The boot list is copied from non-volatile memory and stored in the reserved area of each storage device (step 812), the normal boot procedure is used (step 804), and the process ends.

Thus, the illustrated embodiments described herein provide a computer implemented method, apparatus, and computer program product for booting a computer using a boot list. A determination is made as to whether a boot list is present in a non-volatile memory of the computer. The boot list is a set of paths, in which each path in the boot list is a path of a storage device. If the boot list is not present, a search is performed for the boot list in a reserved area of each storage device in a set of storage devices. When the boot list is found in the reserved area of a storage device in the set of storage devices, the boot list is copied from the reserved area of the storage device in the set of storage devices to form a copied boot list. The copied boot list is stored in the non-volatile memory to form a stored boot list. The computer is booted using the stored boot list in the non-volatile memory.

The illustrative embodiments allow for a computer to be booted quickly when the boot list is not in non-volatile memory. The firmware does not create a boot list by searching each storage device connected to the computer for a boot image.

The flowchart and block diagrams in the figures illustrate the architecture, functionality, and operation of some possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for booting a computer using a boot list, the computer implemented method comprising:
    responsive to a determination that the boot list is not present in a non-volatile memory of the computer, searching a reserved area of each storage device in a set of storage devices connected to the computer for the boot list, wherein the boot list is a set of paths, wherein each path in the boot list is a path of a storage device;
    responsive to finding the boot list in the reserved area of a storage device in the set of storage devices, copying the boot list from the reserved area of the storage device in the set of storage devices to form a copied boot list;
    storing the copied boot list in the non-volatile memory to form a stored boot list; and
    booting the computer using the stored boot list in the non-volatile memory.

2. The computer implemented method of claim 1, wherein the step of booting the computer using the boot list in the non-volatile memory further comprises:
    identifying a storage device referenced by each path in the boot list;
    responsive to identifying a boot image on the storage device, booting the computer using the boot image on the storage device.

3. The computer implemented method of claim 1, further comprising:
    responsive to adding a storage device to the set of storage devices connected to the computer, copying the boot list from the non-volatile memory to form a copied boot list; and
    storing the copied boot-list in the reserved area of the storage device.

4. The computer implemented method of claim 1, further comprising:
    responsive to removing a storage device from the set of storage devices connected to the computer, modifying the boot list in the non-volatile memory; and
    storing the boot-list in the reserved area of each storage device connected to the computer.

5. The computer implemented method of claim 1, wherein connecting the set of storage devices to the computer further comprises:
    connecting the set of storage device to the computer;
    creating a boot list to form a created boot list;
    storing the created boot list in the reserved area of each storage device in the set of storage devices.

6. The computer implemented method of claim 1, wherein the step of creating a boot list further comprises:
    creating a boot list; and
    storing, in the boot list, the path to each storage device in the set of storage devices connected to the computer.

7. A computer program product comprising a non-transitory computer usable medium including computer usable code for booting a computer using a boot list, the computer program product comprising:
    responsive to a determination that the boot list is not present in a non-volatile memory of the computer, computer usable code for searching a reserved area of each storage device in a set of storage devices connected to the computer for the boot list, wherein the boot list is a set of paths, wherein each path in the boot list is a path of a storage device;
    responsive to finding the boot list in the reserved area of a storage device in the set of storage devices, computer usable code for copying the boot list from the reserved area of the storage device in the set of storage devices to form a copied boot list;
    computer usable code for storing the copied boot list in the non-volatile memory to form a stored boot list; and
    computer usable code for booting the computer using the stored boot list in the non-volatile memory.

8. The computer program product comprising of claim 7, wherein the computer usable code for booting the computer using the boot list in the non-volatile memory further comprises:
    computer usable code for identifying a storage device referenced by each path in the boot list; and
    responsive to identifying a boot image on the storage device, computer usable code for booting the computer using the boot image on the storage device.

9. The computer program product comprising of claim 7, further comprising:
    responsive to adding a storage device to the set of storage devices connected to the computer, computer usable code for copying the boot list from the non-volatile memory to form a copied boot list; and
    computer usable code for storing the copied boot-list in the reserved area of the storage device.

10. The computer program product of claim 7, further comprising:
    responsive to removing a storage device from the set of storage devices connected to the computer, computer usable code for modifying the boot list in the non-volatile memory; and
    computer usable code for storing the boot-list in the reserved area of each storage device connected to the computer.

11. The computer program product of claim 7, wherein connecting the set of storage devices to the computer further comprises:
 computer usable code for connecting the set of storage device to the computer;
 computer usable code for creating a boot list to form a created boot list; and
 computer usable code for storing the created boot list in the reserved area of each storage device in the set of storage devices.

12. The computer program product of claim 7, wherein the computer usable code for creating a boot list further comprises:
 computer usable code for creating a boot list; and
 computer usable code for storing, in the boot list, the path to each storage device in the set of storage devices connected to the computer.

13. A data processing system for booting a computer using a boot list, the data processing system comprising:
 a bus;
 a storage device connected to the bus, wherein the storage device contains computer usable code;
 a communications unit connected to the bus; and
 a processing unit connected to the bus for executing the computer usable code, wherein the processing unit executes the computer usable code to responsive to a determination that the boot list is not present in a non-volatile memory of the computer, search a reserved area of each storage device in a set of storage devices connected to the computer for the boot list, wherein the boot list is a set of paths, wherein each path in the boot list is a path of a storage device; responsive to finding the boot list in the reserved area of a storage device in the set of storage devices, copy the boot list from the reserved area of the storage device in the set of storage devices to form a copied boot list; store the copied boot list in the non-volatile memory to form a stored boot list; and boot the computer using the stored boot list in the non-volatile memory.

14. The data processing system of claim 13, wherein the processing unit boots the computer using the boot list in the non-volatile memory by further executing the computer usable code to identify a storage device referenced by each path in the boot list; and responsive to identifying a boot image on the storage device, boot the computer using the boot image on the storage device.

15. The data processing system of claim 13, wherein the processing unit further executes the computer usable code to, responsive to adding a storage device to the set of storage devices connected to the computer, copy the boot list from the non-volatile memory to form a copied boot list; and store the copied boot-list in the reserved area of the storage device.

16. The data processing system of claim 13, wherein the processing unit further executes the computer usable code to, responsive to removing a storage device from the set of storage devices connected to the computer, modify the boot list in the non-volatile memory; and store the boot-list in the reserved area of each storage device connected to the computer.

17. The data processing system of claim 13, wherein the processing unit connects the set of storage devices to the computer by further executing the computer usable code to connect the set of storage device to the computer; create a boot list to form a created boot list; store the created boot list in the reserved area of each storage device in the set of storage devices.

18. The data processing system of claim 13, wherein the processing unit creates a boot list by further executing the computer usable code to create a boot list; and store, in the boot list, the path to each storage device in the set of storage devices connected to the computer.

* * * * *